(12) United States Patent
Fagerstrom

(10) Patent No.: US 11,884,046 B2
(45) Date of Patent: Jan. 30, 2024

(54) COMPOSITE SANDWICH COMPONENTS

(71) Applicant: DIAB INTERNATIONAL AB, Helsingborg (SE)

(72) Inventor: Johan Fagerstrom, Mellbystrand (SE)

(73) Assignee: Diab International AB, Helsingborg (SE)

(*) Notice: Subject to any disclaimer, the term of this patent is extended or adjusted under 35 U.S.C. 154(b) by 99 days.

(21) Appl. No.: 17/770,546

(22) PCT Filed: Oct. 22, 2020

(86) PCT No.: PCT/EP2020/079786
§ 371 (c)(1),
(2) Date: Apr. 20, 2022

(87) PCT Pub. No.: WO2021/078877
PCT Pub. Date: Apr. 29, 2021

(65) Prior Publication Data
US 2022/0388270 A1      Dec. 8, 2022

(30) Foreign Application Priority Data

Oct. 24, 2019    (EP) .................................. 19205020

(51) Int. Cl.
*B32B 3/18*      (2006.01)
*B29C 70/48*     (2006.01)
(Continued)

(52) U.S. Cl.
CPC ................ *B32B 3/18* (2013.01); *B29C 70/48* (2013.01); *B29C 70/547* (2013.01); *B32B 3/30* (2013.01);
(Continued)

(58) Field of Classification Search
CPC .... B32B 3/18; B32B 5/02; B32B 5/18; B32B 18/00; B32B 21/04; B32B 38/08; B32B 2250/40; B32B 2260/026; B32B 2262/0269; B32B 2262/101; B32B 2262/105; B32B 2262/106; B32B 2266/0228; B32B 2266/0235;
(Continued)

(56) References Cited

U.S. PATENT DOCUMENTS 5,904,972 A   5/1999  Tunis, III et al.
6,773,655 B1  8/2004  Tunis, III et al.
(Continued)

FOREIGN PATENT DOCUMENTS

CN    201052678 Y    4/2008
CN    108045010 B    1/2020
(Continued)

OTHER PUBLICATIONS

International Search Report on corresponding PCT application (PCT/EP2020/079786) from International Searching Authority (EPO) dated Jan. 14, 2021.
(Continued)

*Primary Examiner* — Catherine A. Simone
(74) *Attorney, Agent, or Firm* — Shore IP Group, PLLC

(57) ABSTRACT

Methods of manufacturing composite sandwich components (100) and composite sandwich components overcome drawbacks in the prior art. For example, the large number of resin filled perforations that are unavoidable when manufacturing prior art composite sandwich components is avoided.

22 Claims, 9 Drawing Sheets

(51) Int. Cl.
  *B29C 70/54* (2006.01)
  *B32B 3/30* (2006.01)
  *B32B 5/02* (2006.01)
  *B32B 5/18* (2006.01)
  *B32B 18/00* (2006.01)
  *B32B 21/04* (2006.01)
  *B32B 38/08* (2006.01)

(52) U.S. Cl.
  CPC .............. *B32B 5/02* (2013.01); *B32B 5/18* (2013.01); *B32B 18/00* (2013.01); *B32B 21/04* (2013.01); *B32B 38/08* (2013.01); *B32B 2250/40* (2013.01); *B32B 2260/026* (2013.01); *B32B 2260/046* (2013.01); *B32B 2262/0269* (2013.01); *B32B 2262/101* (2013.01); *B32B 2262/105* (2013.01); *B32B 2262/106* (2013.01); *B32B 2266/0228* (2013.01); *B32B 2266/0235* (2013.01); *B32B 2266/0257* (2013.01); *B32B 2266/0264* (2013.01); *B32B 2266/0278* (2013.01)

(58) Field of Classification Search
  CPC .... B32B 2266/0257; B32B 2266/0264; B32B 2266/0278; B29C 70/48; B29C 70/547
  See application file for complete search history.

(56) References Cited

U.S. PATENT DOCUMENTS

2008/0233357 A1  9/2008  Winckler
2010/0209651 A1  8/2010  Mikkelsen et al.
2010/0261000 A1  10/2010  Jones

FOREIGN PATENT DOCUMENTS

| JP | 2000043171 A | 2/2000 |
| JP | 2000043173 A | 2/2000 |
| JP | 2015014326 B | 2/2018 |
| WO | WO02/058915 | 8/2002 |
| WO | 2018088115 A1 | 5/2018 |

OTHER PUBLICATIONS

Written Opinion on corresponding PCT application (PCT/EP2020/079786) from International Searching Authority (EPO) dated Jan. 14, 2021.

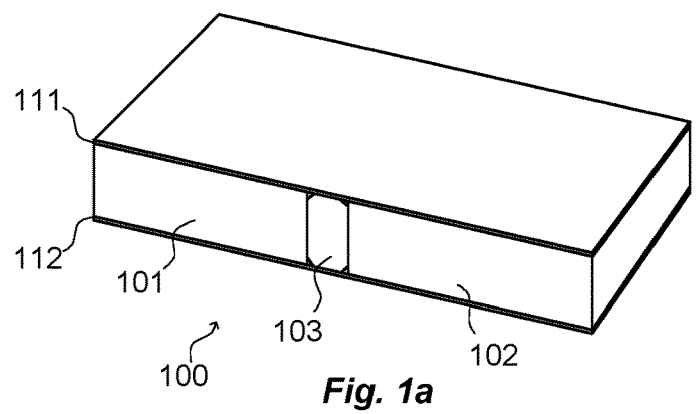
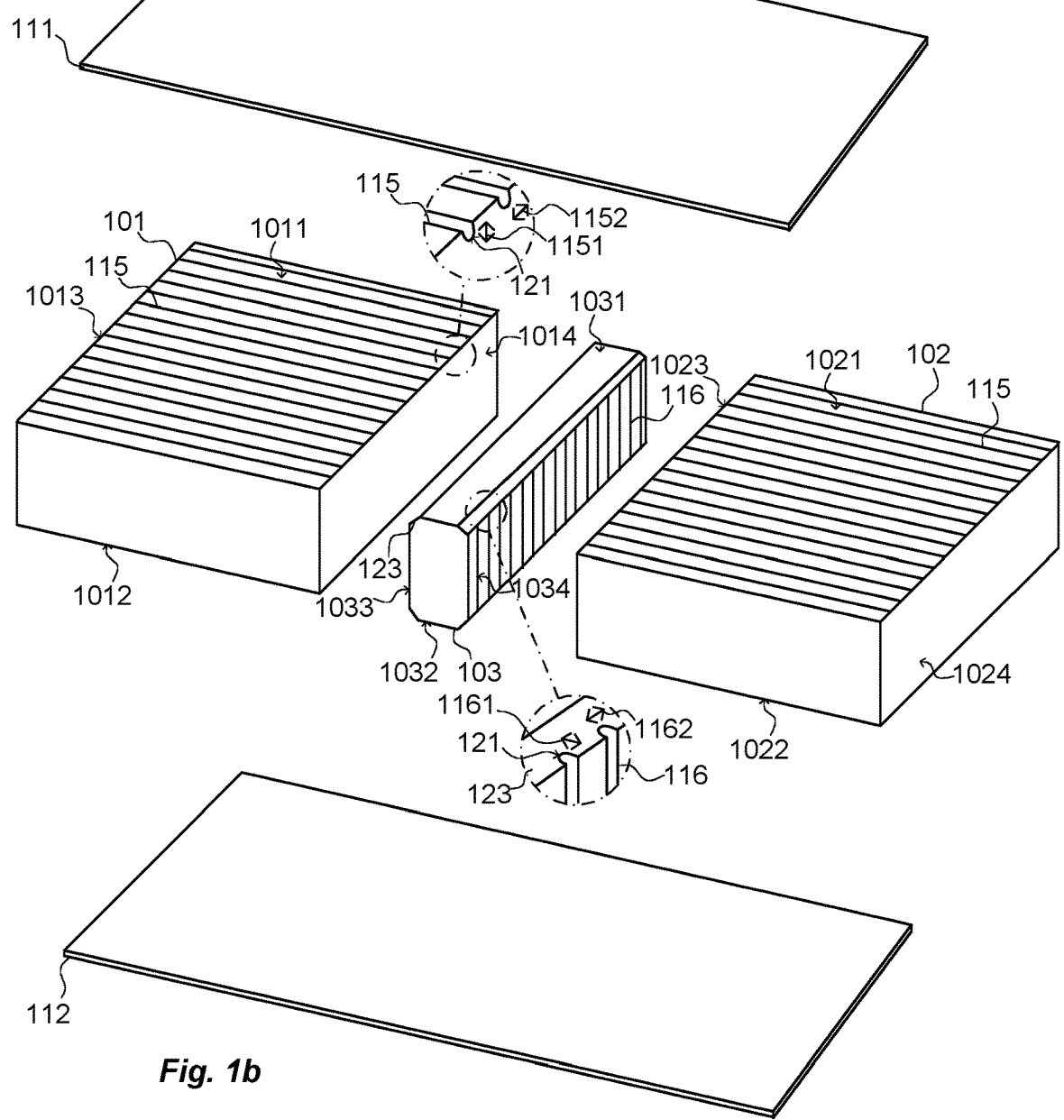

COMPOSITE SANDWICH COMPONENTS

CROSS-REFERENCE TO RELATED APPLICATION

This application is the National Phase, under 35 U.S.C. § 371(c), of International Application No. PCT/EP2020/079786, filed Oct. 2, 2020, which claims priority from European Application No. EP 19205020.1, filed Oct. 24, 2019. The disclosures of all the referenced applications are incorporated herein by reference in their entirety.

FEDERALLY SPONSORED RESEARCH OR DEVELOPMENT

Not Applicable.

TECHNICAL FIELD

Embodiments herein relate to composite sandwich components and methods of manufacturing such composite sandwich components.

BACKGROUND

The use of composite sandwich construction is widely used in order to achieve light, strong and stiff components and structures. Composite sandwich technology is used in many industry sectors such as renewable energy, marine, transport, aerospace, industry, building and many more fields of industry.

Typically, composite sandwich components are manufactured from a core structure that is provided with a top reinforcement layer and a bottom reinforcement layer. The components are arranged as a sandwich in a mould to ensure the geometry of the component, i.e. in order to enable the component to obtain an intended shape, whereupon liquid resin is provided to the arranged components, infusing the reinforcement layers. When the resin hardens, the top and bottom reinforcement layers harden and become firmly fixed to the core structure and a composite sandwich component has been created. The composite sandwich component is then removed from the mould and it is ready for further use in the various fields of technology as mentioned above.

When producing a composite sandwich component, for example with the so-called Resin Transfer Moulding (RTM) or Vacuum Assisted Resin Transfer Moulding (VARTM) or Vacuum Infusion Process (VIP) production process, the liquid and flowing resin has to reach and saturate the reinforcement layers on both the top and bottom sides of the core structure. The resin distribution over the surface areas is typically enabled by a resin transfer aid such as grooves in the core surface, a sacrificial flow mesh or an interlaminar flow media.

However, a problem associated with such processes is that, during infusion of most sandwich components, regardless of industry sector, the resin flow can't be directly fed to the mould side of the sandwich. Therefore a plurality of perforations of the core structure are needed to ensure resin flow from the top reinforcement layer, onto which the resin is provided, to the mould side reinforcement layer, i.e. the bottom reinforcement layer. Typically a number of 1200-2500 perforations per square meter is used in prior art production of composite components.

A drawback associated with the requirement for such perforations is that small diameter perforations are difficult to produce on thick core materials and the actual creation of such perforations has a non-negligible production cost. Furthermore, during the resin infusion process the perforations are filled with resin and hardened resin remain in the perforations for the lifetime of the final sandwich component. Such resin filled perforations, while being essential for the process of manufacturing prior art composite sandwich components, they have negligible contribution to the structural properties of the component and, consequently, the resin in the perforations can be seen as waste, with associated cost, as well as an added non-desirable weight of the component.

SUMMARY

In view of the above, an object of the present disclosure is to overcome drawbacks related to prior art composite sandwich components and methods of manufacturing composite sandwich components.

Such an object is achieved in a first aspect by a method of manufacturing a composite sandwich component. The composite sandwich component comprises a first core structure, a second core structure, a third core structure, a top reinforcement layer and a bottom reinforcement layer. Each of the first, second and third core structures is made of polymer foam or wood, and each of the first, second and third core structures has a respective top surface, a bottom surface, a left edge surface and a right edge surface.

The method of the first aspect comprises the steps of configuring surfaces of the first, second and third core structures with grooves such that:
- the top surface of the first core structure obtains a plurality of grooves extending from the right edge surface,
- the bottom surface of the first core structure obtains a plurality of grooves extending from the right edge surface,
- the top surface of the second core structure obtains a plurality of grooves extending from the left edge surface,
- the bottom surface of the second core structure obtains a plurality of grooves extending from the left edge surface,
- the left edge surface of the third core structure obtains a plurality of grooves extending from the top surface to the bottom surface,
- the right edge surface of the third core structure obtains a plurality of grooves extending from the top surface to the bottom surface.

The method of the first aspect further comprises the steps:
- chamfering at least one intersection of a top surface and an edge surface and at least one intersection of a bottom surface and an edge surface,
- arranging the first, second and third core structures in relation to each other such that the left edge surface of the third core structure abuts the right edge surface of the first core structure and such that the right edge surface of the third core structure abuts the left edge surface of the second core structure,
- arranging the first, second and third core structures on the bottom reinforcement layer,
- arranging the top reinforcement layer on the top surfaces of the first, second and third core structures,
- enclosing the arranged first, second, third core structures and top and bottom reinforcement layers in an enclosure,
- feeding liquid resin onto the top reinforcement layer in a resin feed area above which the left edge surface of the third core structure abuts the right edge surface of the first core structure and the right edge surface of the third core structure abuts the left edge surface of the second core structure, and while the feeding of liquid resin continues, evacuating the enclosure of air, whereby the liquid resin is transported horizontally along the grooves in the top surfaces of the first and second core structures, respectively, and whereby the liquid resin is transported vertically along the grooves in the left and right edge surfaces of the third core structure and horizontally along the grooves in the bottom surfaces of the first and second core structures.

The object of the present disclosure is achieved in a further aspect by a method of manufacturing a composite sandwich component, the composite sandwich component comprising a first core structure, a second core structure, a top reinforcement layer and a bottom reinforcement layer. Each of the first and second core structures is made of polymer foam or wood, and each of the first and the second core structures has a respective top surface, a bottom surface, a left edge surface and a right edge surface.

The method of this further aspect comprises the steps of configuring surfaces of the first and second core structures with grooves such that:
the top surface of the first core structure obtains a plurality of grooves extending from the right edge surface,
the bottom surface of the first core structure obtains a plurality of grooves extending from the right edge surface,
the top surface of the second core structure obtains a plurality of grooves extending from the left edge surface,
the bottom surface of the second core structure obtains a plurality of grooves extending from the left edge surface,
the right edge surface of the first core structure and/or the left edge surface of the second core structure obtains a plurality of grooves extending from the top surface to the bottom surface of the first and second core structures, respectively,
chamfering at least one intersection of a top surface and an edge surface and at least one intersection of a bottom surface and an edge surface,
arranging the first and second core structures in relation to each other such that the right edge surface of the first core structure abuts the left edge surface of the second core structure,
arranging the first and second core structures on the bottom reinforcement layer,
arranging the top reinforcement layer on the top surfaces of the first and second core structures,
enclosing the arranged first and second core structures and top and bottom reinforcement layers in an enclosure,
feeding liquid resin onto the top reinforcement layer in a resin feed area above which the right edge surface of the first core structure abuts the left edge surface of the second core structure, and
while said feeding of liquid resin continues, evacuating the enclosure of air, whereby the liquid resin is transported horizontally along the grooves in the top surfaces of the first and second core structures, respectively, and whereby the liquid resin is transported vertically along the grooves in the right and left edge surfaces of the first and second core structures, respectively, and horizontally along the grooves in the bottom surfaces of the first and second core structures, respectively.

The object of the present disclosure is achieved in yet a further aspect by composite sandwich component comprising a first core structure, a second core structure, a third core structure, a top reinforcement layer and a bottom reinforcement layer. Each of the first, second and third core structures are made of polymer foam or wood, and each of the first, second and third core structures has a respective top surface, a bottom surface, a left edge surface and a right edge surface, wherein:
the top surface of the first core structure is configured with a plurality of grooves extending from the right edge surface,
the bottom surface of the first core structure is configured with a plurality of grooves extending from the right edge surface,
the top surface of the second core structure is configured with a plurality of grooves extending from the left edge surface,
the bottom surface of the second core structure is configured with a plurality of grooves extending from the left edge surface,
the left edge surface of the third core structure is configured with a plurality of grooves extending from the top surface to the bottom surface of the third core structure,
the right edge surface of the third core structure is configured with a plurality of grooves extending from the top surface to the bottom surface of the third core structure,
at least one intersection of a top surface and an edge surface and at least one intersection of a bottom surface and an edge surface are configured with a chamfer,
the first, second and third core structures are arranged in relation to each other such that the left edge surface of the third core structure abuts the right edge surface of the first core structure and such that the right edge surface of the third core structure abuts the left edge surface of the second core structure,
the first, second and third core structures are arranged on the bottom reinforcement layer, and
the top reinforcement layer is arranged on the top surfaces of the first, second and third core structures.

The object of the present disclosure is achieved in yet a further aspect by composite sandwich component comprising a first core structure, a second core structure, a top reinforcement layer and a bottom reinforcement layer. Each of the first and second core structures are made of polymer foam or wood, and each of the first and the second core structures has a respective top surface, a bottom surface, a left edge surface and a right edge surface, wherein:
the top surface of the first core structure is configured with a plurality of grooves extending from the right edge surface,
the bottom surface of the first core structure is configured with a plurality of grooves extending from the right edge surface,
the top surface of the second core structure is configured with a plurality of grooves extending from the left edge surface,
the bottom surface of the second core structure is configured with a plurality of grooves extending from the left edge surface,
the right edge surface of the first core structure and/or the left edge surface of the second core structure is configured with a plurality of grooves, said grooves extending from the top surface to the bottom surface of the first and second core structures, respectively, at least one intersection of a top surface and an edge surface and at least one intersection of a bottom surface and an edge surface are configured with a chamfer, the first and second core structures are arranged in relation to each other such that the right edge surface of the first core structure abuts the left edge surface of the second core structure, the first and second core structures are arranged on the bottom reinforcement layer, and the top reinforcement layer is arranged on the top surfaces of the first and second core structures.

With regard to the chamfers of the intersections of surfaces as summarized above, they may comprises any of:

a chamfered intersection of the top surface and the right edge surface of the first core structure together with a chamfered intersection of the bottom surface and the right edge surface of the first core structure, a chamfered intersection of the top surface and the left edge surface of the second core structure together with a chamfered intersection of the bottom surface and the left edge surface of the second core structure, a chamfered intersection of the top surface and the left edge surface of the third core structure together with a chamfered intersection of the bottom surface and the left edge surface of the third core structure, and a chamfered intersection of the top surface and the right edge surface of the third core structure together with a chamfered intersection of the bottom surface and the right edge surface of the third core structure.

That is, methods of manufacturing a composite sandwich components and composite sandwich components as summarized above overcome drawbacks in the prior art. For example, the large number of resin filled perforations that are unavoidable when manufacturing prior art composite sandwich components is avoided.

In other words, as summarized in the various aspects, by configuring top, bottom and side surfaces with grooves and configuring intersections of top/bottom and side surfaces with a chamfer, the flow of resin from the resin feed area to the bottom surfaces is facilitated. Resin that is fed and permeates the top reinforcement layer gathers in the chamfer in the top surface intersection and is transported by a pressure gradient via the side surface grooves to the chamfer in the bottom surface intersection. Having gathered in the chamfers in the top and bottom surfaces intersection, the resin flows along the grooves in the top and bottom surfaces, the flow being driven by pressure gradients obtained by the evacuation of air from the enclosure in which the components are arranged. The resin flow driven by the pressure gradients is not only along the grooves in the top and bottom surfaces, but also in directions transverse to the grooves such that the top and bottom surfaces with reinforcement layers become completely saturated with resin and thereby, when the resin has hardened, merging the single materials into a composite sandwich component.

An advantage of such methods of manufacturing a composite sandwich components and composite sandwich components as summarized above is a significant reduction of waste resin, with associated reduced cost as well as a minimization of non-desirable weight of the component.

BRIEF DESCRIPTION OF THE DRAWINGS

FIG. 1a illustrates schematically in a perspective view a composite sandwich component, FIG. 1b illustrates schematically an exploded view of the composite sandwich component in FIG. 1a, FIG. 2a illustrates schematically in a perspective view a composite sandwich component.

DETAILED DESCRIPTION

Figure 2A:
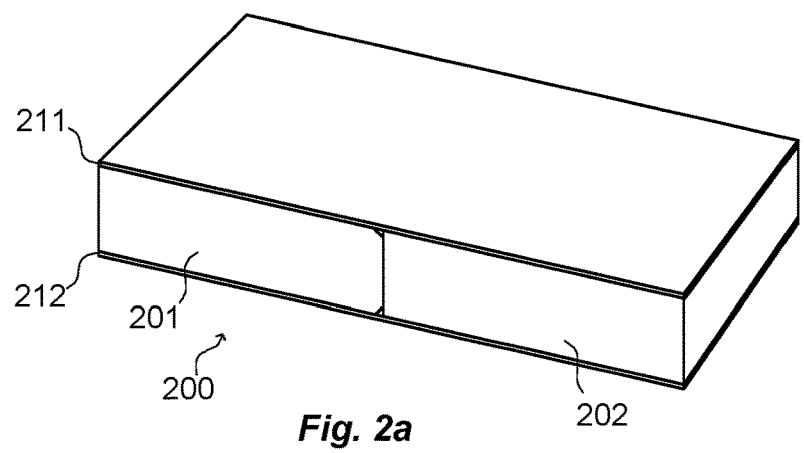
FIG. 2b illustrates schematically an exploded view of the composite sandwich component in FIG. 2a, FIGS. 3a and 3b illustrate schematically in perspective views a respective core structure.

FIGS. 1a and 1b illustrate a composite sandwich component 100 comprising a first core structure 101, a second core structure 102, a third core structure 103, a top reinforcement layer 111 and a bottom reinforcement layer 112. In FIG. 1a, the composite sandwich component 100 is illustrated in a form obtained subsequent to manufacturing, steps of which will be described further in detail below, and in FIG. 1b various components of the composite sandwich component 100 are illustrated in an exploded view.

It is to be noted that the various components of the composite sandwich component 100 in FIGS. 1a and 1b, and throughout the present disclosure, will be referred to by use of spatial directions and orientations such as top, bottom, left and right. Needless to say, as the skilled person will realize, such spatial information is used for the sake of clarity and for the purpose of simplifying the exemplifying description of how the various components may be arranged in relation to each other.

Each of the first, second and third core structures 101, 102, 103 is made of polymer foam or wood and each of the first, second and third core structures 101, 102, 103 has a respective top surface 1011, 1021, 1031, a bottom surface 1012, 1022, 1032, a left edge surface 1013, 1023, 1033 and a right edge surface 1014, 1024, 1034. Furthermore, the top surface 1011 of the first core structure 101 is configured with a plurality of grooves 115 extending from the right edge surface 1014, the bottom surface 1012 of the first core structure 101 is configured with a plurality of grooves 115 extending from the right edge surface 1014, the top surface 1021 of the second core structure 102 is configured with a plurality of grooves 115 extending from the left edge surface 1023, the bottom surface 1022 of the second core structure 102 is configured with a plurality of grooves 115 extending from the left edge surface 1023, the left edge surface 1033 of the third core structure 103 is configured with a plurality of grooves 116 extending from the top surface 1031 to the bottom surface 1013 of the third core structure 103, and the right edge surface 1034 of the third core structure 103 is configured with a plurality of grooves 116 extending from the top surface 1031 to the bottom surface 1013 of the third core structure 103.

Although the grooves 115 on the top surfaces 1011, 1021 and the corresponding grooves (not visible) on the bottom surfaces 1012, 1022 on the first and second core structures 101, 102 are illustrated as being parallel and continuing across the respective surface to respective edge surface 1013, 1024, other configurations of the grooves 115 are possible as will be exemplified below. Moreover, although FIG. 1b may suggest that the grooves 115 in the top surfaces 1011, 1021 of the first and second core structures 101, 102 are aligned with each other and aligned with the grooves 116 on the side surface 1034 of the third core structure 103 at chamfers 123, such alignment is not necessary as will be discussed further below.

At least one intersection of a top surface 1011, 1021, 1031 and an edge surface 1014, 1023, 1033, 1034 and at least one intersection of a bottom surface 1012, 1022, 1032 and an edge surface 1014, 1023, 1033, 1034 are configured with a chamfer 123. The composite sandwich component 100 exemplified in FIGS. 1a and 1b illustrates a chamfered intersection of the top surface 1031 and the left edge surface 1033 of the third core structure 103 together with a chamfered intersection of the bottom surface 1032 and the left edge surface 1033 of the third core structure 103, and a chamfered intersection of the top surface 1031 and the right edge surface 1034 of the third core structure 103 together with a chamfered intersection of the bottom surface 1032 and the right edge surface 1034 of the third core structure 103. However, other combinations of chamfered surface intersections are possible as will be exemplified below.

The first, second and third core structures 101, 102, 103 are arranged in relation to each other such that the left edge surface 1033 of the third core structure 103 abuts the right edge surface 1014 of the first core structure 101 and such that the right edge surface 1034 of the third core structure 103 abuts the left edge surface 1023 of the second core structure 102.

The first, second and third core structures 101, 102, 103 are arranged on the bottom reinforcement layer 112, and the top reinforcement layer 111 is arranged on the top surfaces of the first, second and third core structures 101, 102, 103.

Although not visible in FIGS. 1a and 1b, resin, which has hardened as a consequence of a sequence of manufacturing steps as will be described below, fills the grooves 115, 116.

Figure 2B:
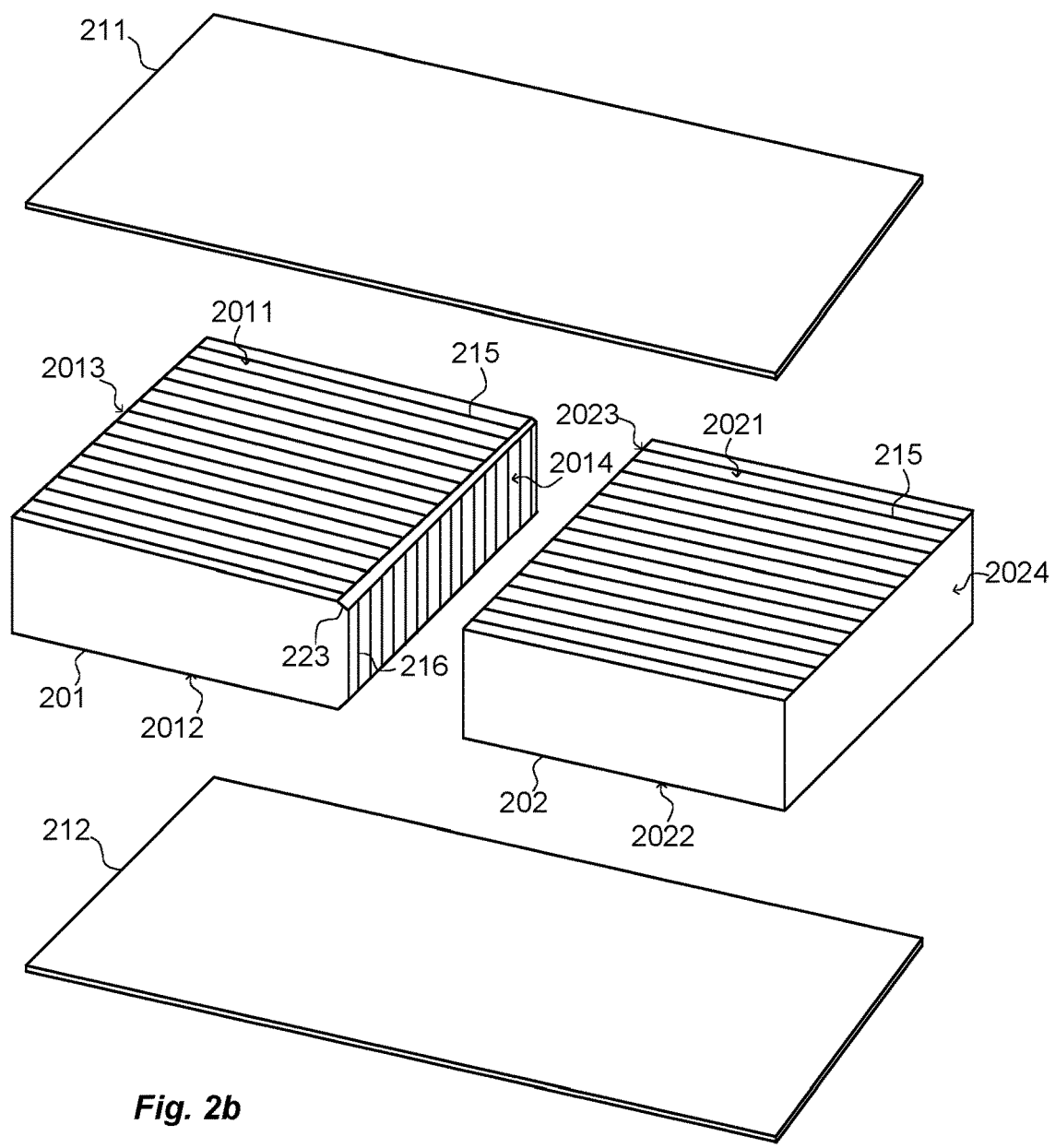

FIGS. 2a and 2b illustrate a composite sandwich component 200 comprising a first core structure 201, a second core structure 202, a top reinforcement layer 211 and a bottom reinforcement layer 212. Similar to the illustrations in FIGS. 1a and 1b, in FIG. 2a, the composite sandwich component 200 is illustrated in a form obtained subsequent to manufacturing, steps of which will be described further in detail below, and in FIG. 2b various components of the composite sandwich component 200 are illustrated in an exploded view.

Each of the first and second core structures 201, 202 being made of polymer foam or wood, each of the first and the second core structures 201, 202 having a respective top surface 2011, 2021, a bottom surface 2012, 2022, a left edge surface 2013, 2023 and a right edge surface 2014, 2024. Furthermore, the top surface 2011 of the first core structure 201 is configured with a plurality of grooves 215 extending from the right edge surface 2014, the bottom surface 2012 of the first core structure 201 is configured with a plurality of grooves 215 extending from the right edge surface 2014, the top surface 2021 of the second core structure 202 is configured with a plurality of grooves 215 extending from the left edge surface 2023, and the bottom surface 2022 of the second core structure 202 is configured with a plurality of grooves 215 extending from the left edge surface 2023. In the specific example of FIG. 2b, the right edge surface 2014 of the first core structure 201 is configured with a plurality of grooves 216, said grooves 216 extending from the top surface 2011 to the bottom surface 2012 of the first core structure 201. However, alternative examples include those where, also or alternatively, the left edge surface 2023 of the second core structure 202 is configured with a plurality of grooves 216, said grooves 216 extending from the top surface 2021 to the bottom surface 2022 of the second core structure 202.

Although the grooves 215 on the top surfaces 2011, 2021 and the corresponding grooves (not visible) on the bottom surfaces 2012, 2022 on the first and second core structures 201, 202 are illustrated as being parallel and continuing across the respective surface to respective edge surface 2013, 2024, other configurations of the grooves 215 are possible as will be exemplified below. Moreover, although FIG. 2b may suggest that the grooves 215 in the top surfaces 2011, 2021 of the first and second core structures 201, 202 are aligned with each other and aligned with the grooves 216 on the side surface 2014 of the first core structure 201 at chamfer 223, such alignment is not necessary as will be discussed further below.

At least one intersection of a top surface 2011, 2021 and an edge surface 2014, 2023 and at least one intersection of a bottom surface 2012, 2022 and an edge surface 2014, 2023 are configured with a chamfer 223. The composite sandwich component 200 exemplified in FIGS. 2a and 2b illustrates a chamfered intersection of the top surface 2011 and the right edge surface 2014 of the first core structure 201 together with a chamfered intersection of the bottom surface 2012 and the right edge surface 2014 of the first core structure 201. However, other combinations of chamfered surface intersections are possible as will be exemplified below.

The first and second core structures 201, 202 are arranged in relation to each other such that the right edge surface 2014 of the first core structure 201 abuts the left edge surface 2023 of the second core structure 202.

The first and second core structures 201, 202 are arranged on the bottom reinforcement layer 212, and the top reinforcement layer 211 is arranged on the top surfaces of the first and second core structures 201, 202.

Although not visible in FIGS. 2a and 2b, resin, which has hardened as a consequence of a sequence of manufacturing steps as will be described below, fills the grooves 215, 216.

With regard to which material or materials the core structures 101, 102, 103, 201, 202 are made of, any of the first core structure 101, 201, the second core structure 102, 202 and the third core structure 103 may be made of any polymeric foam material or wood based material such as any of the materials Polyvinyl chloride (PVC), Polyethylene terephthalate (PET), Polyethersulfone (PES), Polymethacrylimide (PMI), Styrene acrylonitrile (SAN), Polyurethane, Balsa wood and Plywood.

With regard to which material or materials the reinforcement layers 111, 112, 211, 212 are made of, any of the top reinforcement layer 111, 211 and the bottom reinforcement layer 112, 212 is made of any reinforcement material such as any of the materials glass fibre material, carbon fibre material, natural fibre material, thermoplastic fibre material, aramid fibre material and ceramic material.

Figure 3A:
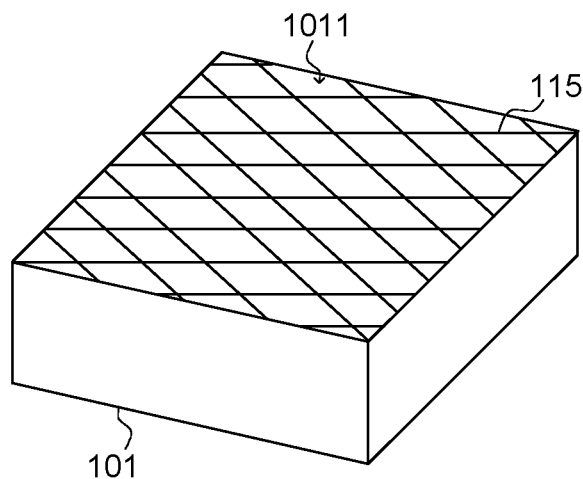
Figure 3B:
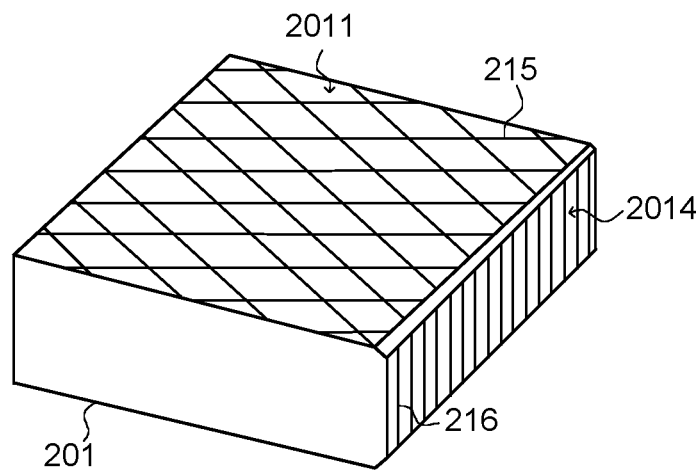

As exemplified in FIGS. 3a and 3b, it is to be pointed out that the grooves 115, 116, 215, 216 that are described above may be aligned along other directions than those indicated in connection with the examples in FIGS. 1a-b and FIGS. 2a-b. For example, grooves 115, 215 on any top and bottom surface may be aligned in a more diagonal configuration, although a vertical alignment is at least desirable with regard to grooves 116, 216 on side surfaces due to the fact that such an alignment makes the length of these grooves 116, 216 minimal. Needless to say, a minimal length of the grooves minimizes the time it takes to convey resin from the top surfaces to the bottom surfaces. This minimizes any time difference for the horizontal flow of resin on the top surface and the bottom surface to cover the top and bottom surfaces, remembering that it is desirable to cover the top and bottom surfaces as close as possible in time.

Moreover, although not illustrated, grooves 115, 116, 215, 216 may be less straight than illustrated in the figures herein. For example, examples of core structures include those having more or less curved or meandering grooves, which may be useful in cases where the structures have more complex geometry than those structures exemplified herein.

Figure 4A:
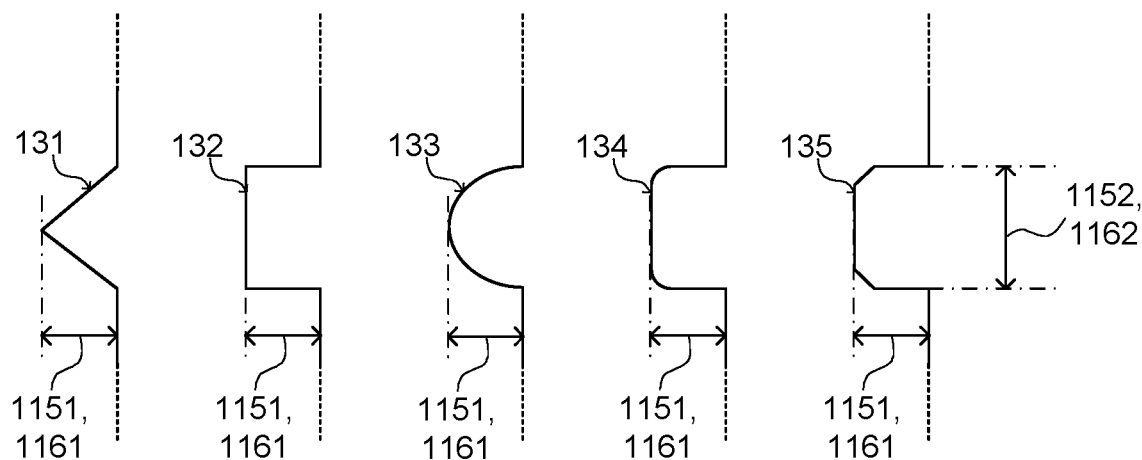
FIG. 4a illustrates schematically cross section views of grooves.

Furthermore, with regard to the grooves 115, 116, 215, 216, reference is made to FIG. 4a, which illustrates a number of examples of groove profiles that the grooves 115, 116, 215, 216 may be configured with. As exemplified, any of the grooves 115, 116, 215, 216 are configured with a groove profile 121, 221 that is any of a triangular groove profile 131, a rectangular groove profile 132, a rounded groove profile 133, a combination of a rectangular and a rounded groove profile 134, and a combination of a rectangular and a triangular groove profile 135.

Any of the grooves 115, 116, 215, 216 may be configured with a depth 1151, 1161 that is in the interval 1.0 to 2.5 mm, preferably in the interval 1.3 to 2.0 mm, and a width 1152, 1162 that is in the interval 1.0 to 2.5 mm, preferably in the interval 1.3 to 2.0 mm.

Moreover, at least two grooves among the grooves 115, 116, 215, 216 may be configured essentially in parallel with each other and have an average distance from each other that is in the interval 15 to 35 mm, preferably in the interval 20 to 25 mm. However, as pointed out above, core structures may be configured with curved or meandering grooves. The average distances exemplified above are applicable also for such curved or meandering grooves.

Groove dimensions and spacing between grooves can be adjusted to suit production with specific resins and fibre reinforcements as well as sandwich component size and geometry.

As indicated above in connection with the description of FIGS. 1a-b and FIGS. 2a-b, with regard to the chamfers 123, 223, they may comprises any of a chamfered intersection of the top surface 1011, 2011 and the right edge surface 1014, 2014 of the first core structure 101, 201 together with a chamfered intersection of the bottom surface 1012, 2012 and the right edge surface 1014, 2014 of the first core structure 101, 201, a chamfered intersection of the top surface 1021, 2021 and the left edge surface 1023, 2023 of the second core structure 102, 202 together with a chamfered intersection of the bottom surface 1022, 2022 and the left edge surface 1023, 2023 of the second core structure 102, 202, a chamfered intersection of the top surface 1031 and the left edge surface 1033 of the third core structure 103 together with a chamfered intersection of the bottom surface 1032 and the left edge surface 1033 of the third core structure 103, and a chamfered intersection of the top surface 1031 and the right edge surface 1034 of the third core structure 103 together with a chamfered intersection of the bottom surface 1032 and the right edge surface 1034 of the third core structure 103.

Figure 4B:
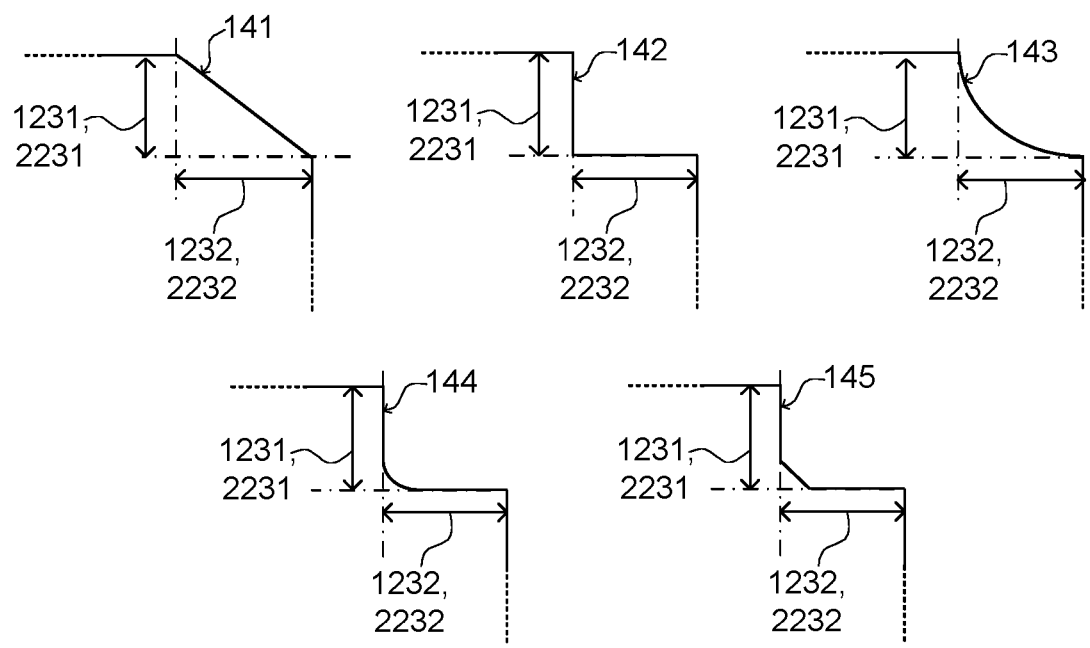
FIG. 4b illustrates schematically cross section views of chamfers.
Figure 5:
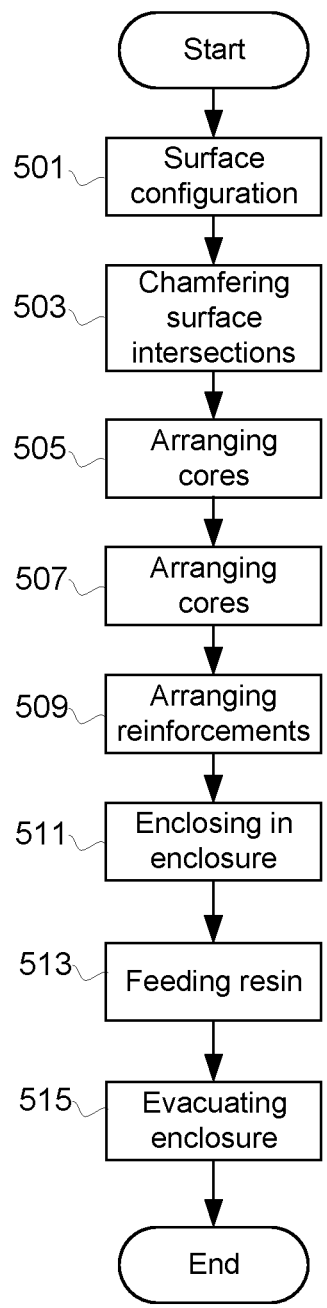
FIGS. 5 and 6 are flow charts of methods of manufacturing a composite sandwich component.
Figure 6:
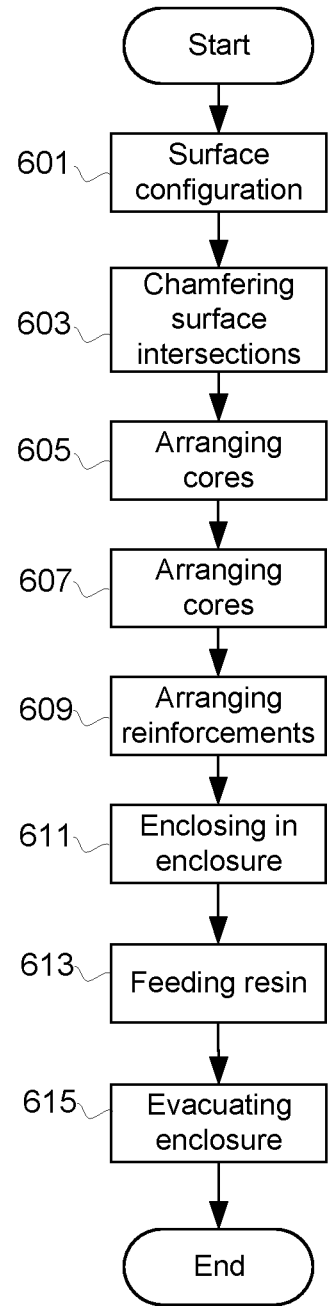

With reference to FIG. 4b, which illustrates a number of examples of chamfer profiles that the chamfer 123, 223 may be configured with, the chamfers 123, 223, may be configured with a chamfering profile 123, 223 at any intersection of surfaces that is any of a triangular chamfering profile 141, a rectangular chamfering profile 142, a rounded chamfering profile 143, a combination of a rectangular and a rounded chamfering profile 144, and a combination of a rectangular and a triangular chamfering profile 145.

Any of the chamfers 123, 223 at any intersection of surfaces may be configured with a depth 1231, 2231 that is in the interval 1.5 to 3.0 mm, preferably in the interval 1.7 to 2.5 mm, and a width 1232, 2232 that is in the interval 1.0 to 2.5 mm, preferably in the interval 1.3 to 2.0 mm.

Turning now to FIGS. 5, 7a-b, 9 and 10a-b, a method of manufacturing a composite sandwich component, for example the composite sandwich component 100 described above, will be described in some detail. The composite sandwich component 100 comprises a first core structure 101, a second core structure 102, a third core structure 103, a top reinforcement layer 111 and a bottom reinforcement layer 112. Each of the first, second and third core structures 101, 102, 103 is made of polymer foam or wood and each of the first, second and third core structures 101, 102, 103 has a respective top surface 1011, 1021, 1031, a bottom surface 1012, 1022, 1032, a left edge surface 1013, 1023, 1033 and a right edge surface 1014, 1024, 1034.

The method comprises a plurality of steps as follows:

Step 501

A surface configuration step that comprises configuring surfaces of the first, second and third core structures 101, 102, 103 with grooves 115, 116 such that:

the top surface 1011 of the first core structure 101 obtains a plurality of grooves 115 extending from the right edge surface 1014, the bottom surface 1012 of the first core structure 101 obtains a plurality of grooves 115 extending from the right edge surface 1014, the top surface 1021 of the second core structure 102 obtains a plurality of grooves 115 extending from the left edge surface 1023, the bottom surface 1022 of the second core structure 102 obtains a plurality of grooves 115 extending from the left edge surface 1023, the left edge surface 1033 of the third core structure 103 obtains a plurality of grooves 116 extending from the top surface 1031 to the bottom surface 1032, the right edge surface 1034 of the third core structure 103 obtains a plurality of grooves 116 extending from the top surface 1031 to the bottom surface 1032.

Step 503

A chamfering step that comprises chamfering at least one intersection of a top surface 1011, 1021, 1031 and an edge surface 1014, 1023, 1033, 1034 and at least one intersection of a bottom surface 1012, 1022, 1032 and an edge surface 1014, 1023, 1033, 1034.

For example, the chamfering step 503 may comprises chamfering any of:

the intersection of the top surface 1011 and the right edge surface 1014 of the first core structure 101 together with the intersection of the bottom surface 1012 and the right edge surface 1014 of the first core structure 101, the intersection of the top surface 1021 and the left edge surface 1023 of the second core structure 102 together with the intersection of the bottom surface 1022 and the left edge surface 1023 of the second core structure 102, the intersection of the top surface 1031 and the left edge surface 1033 of the third core structure 103 together with the intersection of the bottom surface 1032 and the left edge surface 1033 of the third core structure 103, and the intersection of the top surface 1031 and the right edge surface 1034 of the third core structure 103 together with the intersection of the bottom surface 1032 and the right edge surface 1034 of the third core structure 103.

Figure 7A:
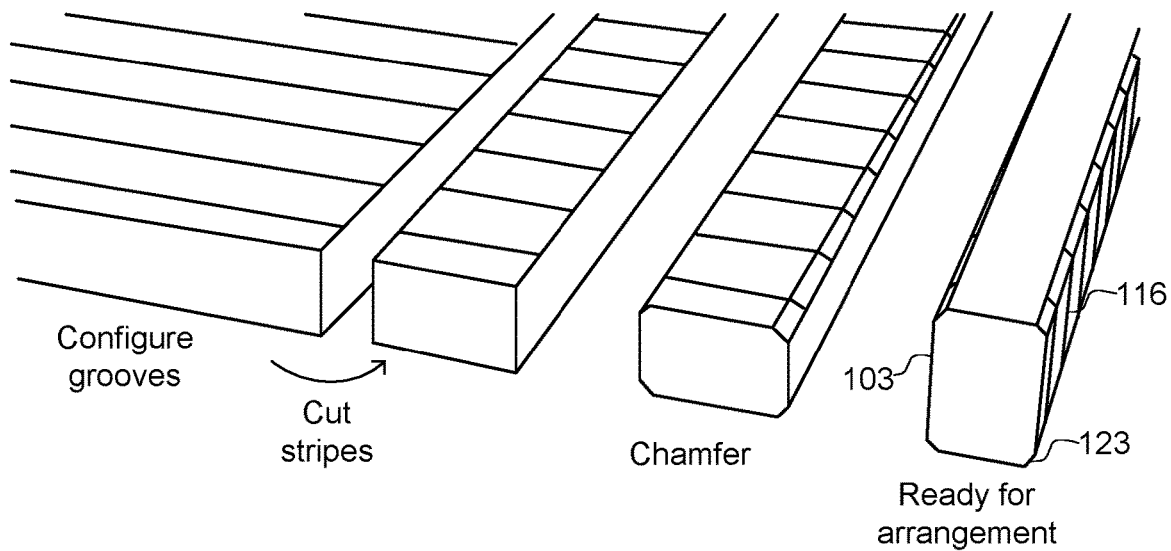
FIGS. 7a and 7b illustrate schematically in perspective views a core structure during steps of manufacturing.

FIG. 7a illustrates schematically an example of a sequence of steps how a core structure blank is configured on both top and bottom surfaces with grooves, then cut into one or more grooved stripes and chamfered to produce a core structure such as the third core structure 103 ready to be arranged as will be described below.

Figure 7B:
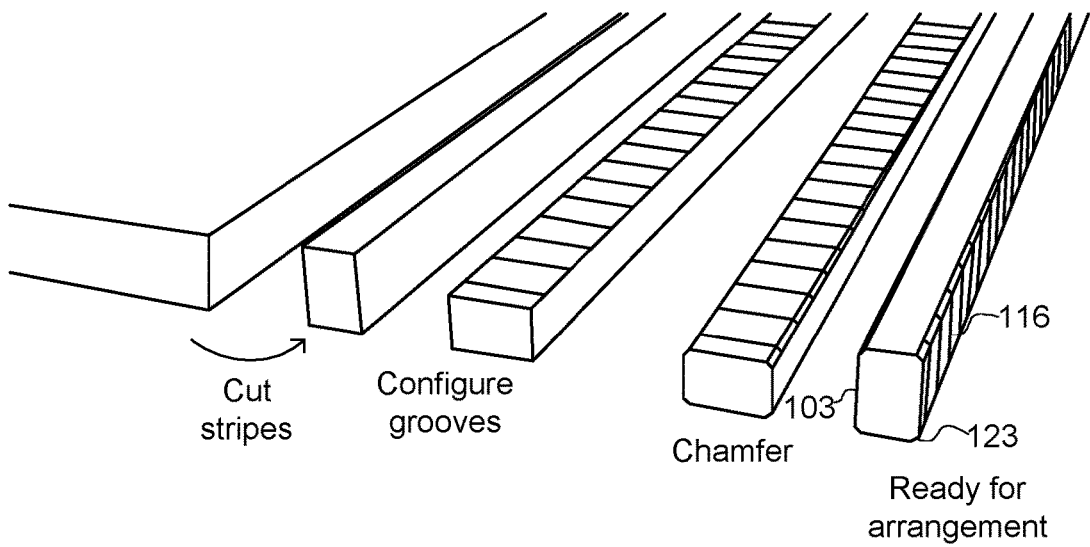

FIG. 7b illustrates schematically another example of a sequence of steps how a core structure blank is first cut into stripes and then the stripes are configured on both top and bottom surfaces with grooves and chamfered to produce a core structure such as the third core structure 103 ready to be arranged as will be described below.

Step 505

An arrangement step comprising arranging the first, second and third core structures 101, 102, 103 in relation to each other such that the left edge surface 1033 of the third core structure 103 abuts the right edge surface 1014 of the first core structure 101 and such that the right edge surface 1034 of the third core structure 103 abuts the left edge surface 1023 of the second core structure 102.

Step 507

An arrangement step comprising arranging the first, second and third core structures 101, 102, 103 on the bottom reinforcement layer 112.

Step 509

An arrangement step comprising arranging the top reinforcement layer 111 on the top surfaces of the first, second and third core structures 101, 102, 103.

The arrangement steps 505, 507 and 509 may involve the use of kitted (i.e. pre cut) components to increase efficiency.

Step 511

An enclosing step comprising enclosing the arranged 505, 507, 509 first, second, third core structures 101, 102, 103 and top and bottom reinforcement layers 111, 112 in an enclosure 160.

The enclosure 160 is air-tight and it is configured such that it will withstand the evacuation of air without being damaged.

Step 513

A feeding step comprising feeding liquid resin onto the top reinforcement layer 111 in a resin feed area 170 above which the left edge surface 1033 of the third core structure 103 abuts the right edge surface 1014 of the first core structure 101 and the right edge surface 1034 of the third core structure 103 abuts the left edge surface 1023 of the second core structure 102.

Figure 9:
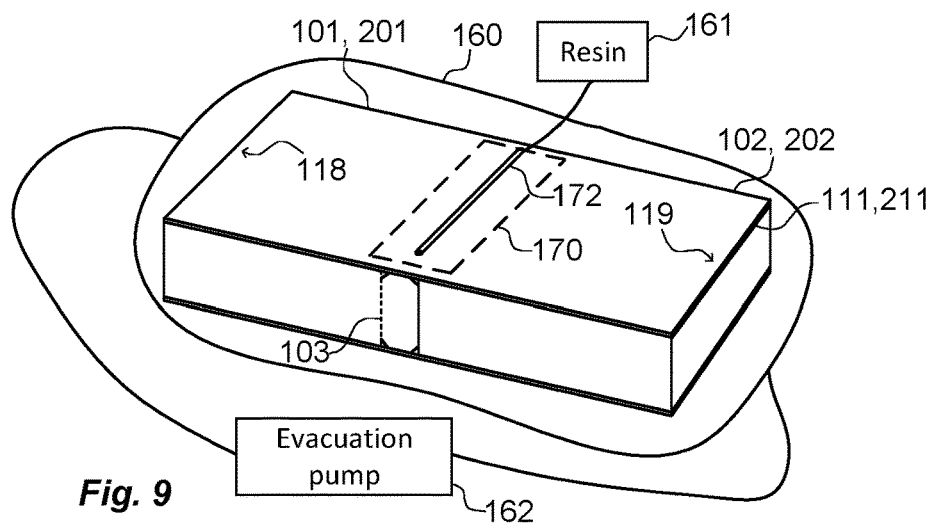
FIG. 9 is a schematically illustrated block diagram of manufacturing of a composite sandwich component, FIGS. 10a and 10b schematically illustrate perspective views of flow of resin during manufacturing of a composite sandwich component, and FIGS. 11a and 11b schematically illustrate perspective views of flow of resin during manufacturing of a composite sandwich component.

The feeding of resin may advantageously take place from a resin reservoir 161 via a resin feed line 172, e.g. a spiral hose or profile as is known in the art, and although not illustrated in FIG. 9, a flow mesh may be arranged in the feed area 170 in order to distribute the flow of resin evenly in the feed area 170. The resin feed area 170 may further be configured with, e.g., a peel-ply layer in order to ensure easy removal of such a flow mesh when the feeding of resin has been terminated.

Step 515

An evacuation step comprising, while the feeding in step 513 of liquid resin continues, evacuating the enclosure 170 of air, whereby the liquid resin is transported horizontally along the grooves 115 in the top surfaces 1011, 1021 of the first and second core structures 101, 102, respectively, and whereby the liquid resin is transported vertically along the grooves 116 in the left and right edge surfaces 1033, 1034 of the third core structure 103 and horizontally along the grooves 115 in the bottom surfaces 1012, 1022 of the first and second core structures 101, 102.

The evacuation of air from the air-tight enclosure 160 may be realized by means of an evacuation pump 162 connected to the enclosure 160 at points on the enclosure 160 distributed in such a manner that a level of vacuum is obtained.

Figure 10A:
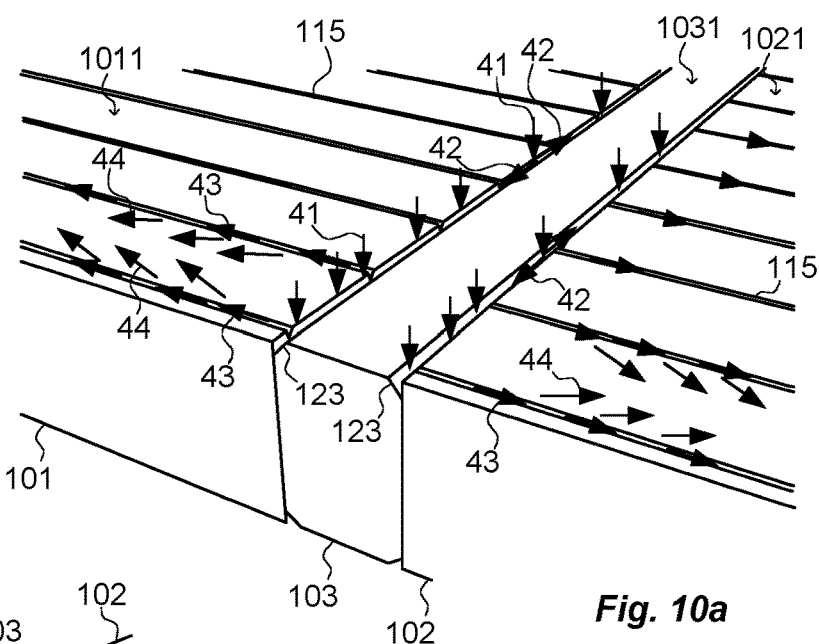
Figure 10B:
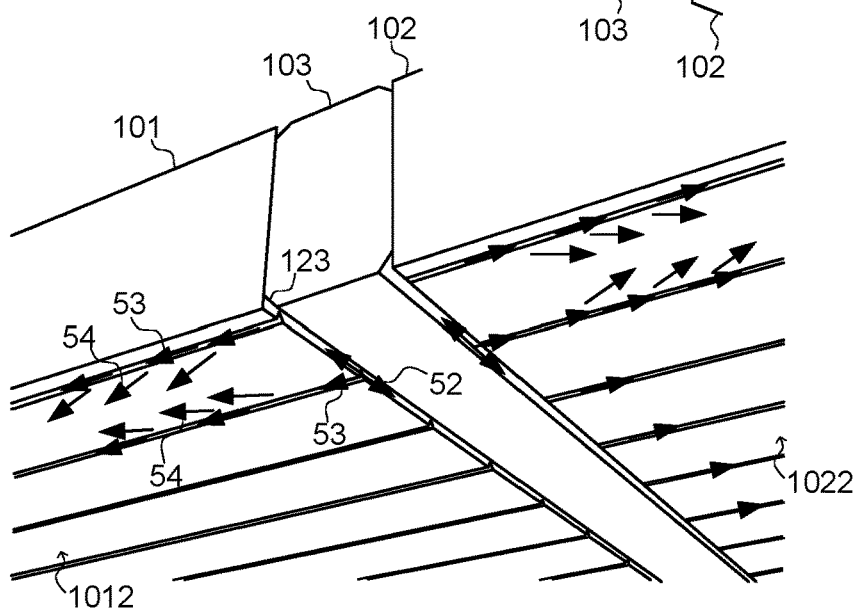

As illustrated schematically in FIG. 10a and FIG. 10b (noting that the reinforcement layers are omitted for the sake of clarity), resin that is fed 41 in the feed area 170 permeates the top reinforcement layer and gathers 42 in the chamfers 123 in the top surface intersections and transported by a pressure gradient via the side surface grooves to the chamfers 123 in the bottom surface intersections. Having gathered in the chamfers 123 in the top and bottom surfaces intersections, the resin flows 43, 53 along the grooves 115 in the top and bottom surfaces 1011, 1012, 1021, 1022, the flow 43, 53 being driven by pressure gradients obtained by the evacuation of air from the enclosure 160 in which the components are arranged. The resin flow 43, 53 driven by the pressure gradients is not only along the grooves 115, but also in directions 44, 54 transverse to the grooves 115 such that the top and bottom surfaces 1011, 1012, 1021, 1022 with reinforcement layers 111, 112 become completely saturated with resin and thereby, when the resin has hardened, merging the single materials into a composite sandwich component.

Turning now to FIGS. 6, 8, 9 and 11a-b, a method of manufacturing a composite sandwich component, for example the composite sandwich component 200 described above, will be described in some detail. The composite sandwich component 200 comprises a first core structure 201, a second core structure 202, a top reinforcement layer 211 and a bottom reinforcement layer 212. Each of the first and second core structures 201, 202 is made of polymer foam or wood and each of the first and the second core structures 201, 202 has a respective top surface 2011, 2021, a bottom surface 2012, 2022, a left edge surface 2013, 2023 and a right edge surface 2014, 2024.

The method comprises a plurality of steps as follows:

Step 601

A surface configuration step that comprises configuring surfaces of the first and second core structures 201, 202 with grooves 215, 216 such that:

the top surface 2011 of the first core structure 201 obtains a plurality of grooves 215 extending from the right edge surface, the bottom surface 2012 of the first core structure 201 obtains a plurality of grooves 215 extending from the right edge surface 2014, the top surface 2021 of the second core structure 202 obtains a plurality of grooves 215 extending from the left edge surface 2023, the bottom surface 2022 of the second core structure 202 obtains a plurality of grooves 215 extending from the left edge surface 2023, the right edge surface 2014 of the first core structure 201 and/or the left edge surface 2023 of the second core structure 202 obtains a plurality of grooves 216 extending from the top surface 2011, 2021 to the bottom surface 2012, 2022 of the first and second core structures 201, 202, respectively.

Step 603

A chamfering step that comprises chamfering at least one intersection of a top surface 2011, 2021 and an edge surface 2014, 2023 and at least one intersection of a bottom surface 2012, 2022 and an edge surface 2014, 2023.

For example, the chamfering step 603 may comprises chamfering any of:
- the intersection of the top surface 2011 and the right edge surface 2014 of the first core structure 201 together with the intersection of the bottom surface 2012 and the right edge surface 2014 of the first core structure 201, and
- the intersection of the top surface 2021 and the left edge surface 2023 of the second core structure 202 together with the intersection of the bottom surface 2022 and the left edge surface 2023 of the second core structure 202.

Figure 8:
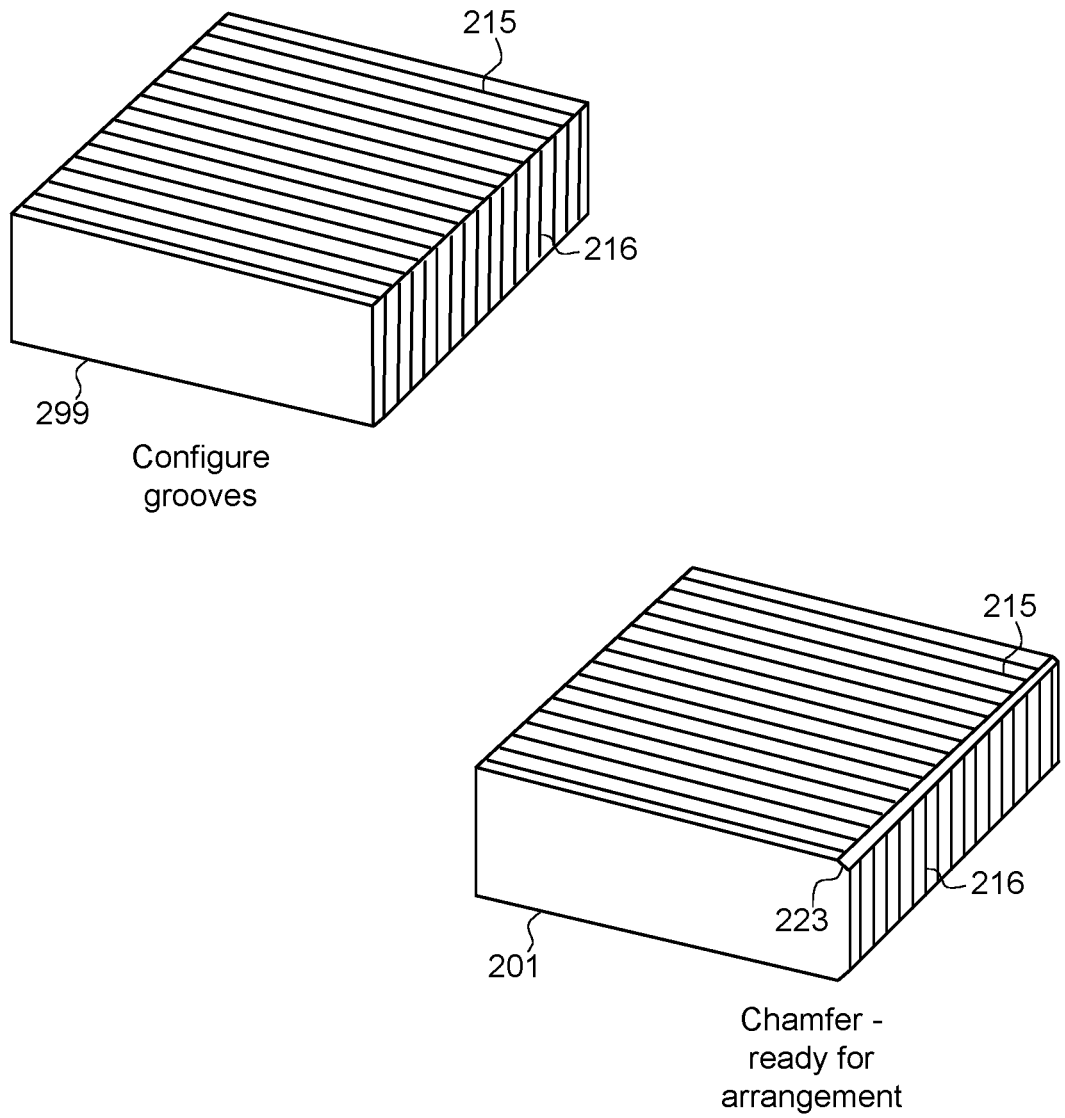
FIG. 8 illustrates schematically in perspective views a core structure during steps of manufacturing.

FIG. 8 illustrates schematically how a core structure blank 299 is configured with grooves 215, 216 on the top, side and bottom surfaces and chamfered to produce a core structure such as the first core structure 201 ready to be arranged as will be described below.

Step 605

An arrangement step comprising arranging the first and second core structures 201, 202 in relation to each other such that the right edge surface 2014 of the first core structure 201 abuts the left edge surface 2023 of the second core structure 202.

Step 607

An arrangement step comprising arranging the first and second core structures 201, 202 on the bottom reinforcement layer 212.

Step 609

An arrangement step comprising arranging the top reinforcement layer 211 on the top surfaces of the first and second core structures 201, 202.

Similar to the examples described above, the arrangement steps 605, 607 and 609 may involve the use of kitted (i.e. pre cut) components to increase efficiency.

Step 611

An enclosing step comprising enclosing the arranged 605, 607, 609 first and second core structures 201, 202 and top and bottom reinforcement layers 211, 212 in an enclosure 160.

The enclosure 160 is air-tight and it is configured such that it will withstand the evacuation of air without being damaged.

Step 613

A feeding step comprising feeding liquid resin onto the top reinforcement layer 211 in a resin feed area 170 above which the right edge surface 2014 of the first core structure 201 abuts the left edge surface 2023 of the second core structure 202.

The feeding of resin may advantageously take place from a resin reservoir 161 via a resin feed line 172, e.g. a spiral hose or profile as is known in the art, and although not illustrated in FIG. 9, a flow mesh may be arranged in the feed area 170 in order to distribute the flow of resin evenly in the feed area 170. The resin feed area 170 may further be configured with, e.g., a peel-ply layer in order to ensure easy removal of such a flow mesh when the feeding of resin has been terminated.

Step 615

An evacuation step comprising, while the feeding in step 613 of liquid resin continues, evacuating the enclosure 160 of air, whereby the liquid resin is transported horizontally along the grooves 215 in the top surfaces 2011, 2021 of the first and second core structures 201, 202, respectively, and whereby the liquid resin is transported vertically along the grooves 216 in the right and left edge surfaces 2014, 2023 of the first and second core structures 201, 201, respectively, and horizontally along the grooves 115 in the bottom surfaces 2012, 2022 of the first and second core structures 201, 202, respectively.

Figure 11A:
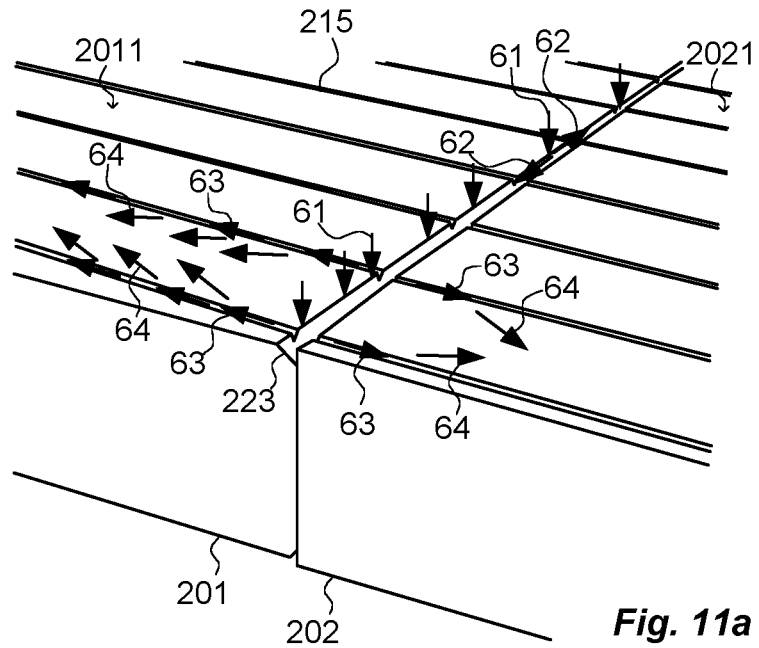
Figure 11B:
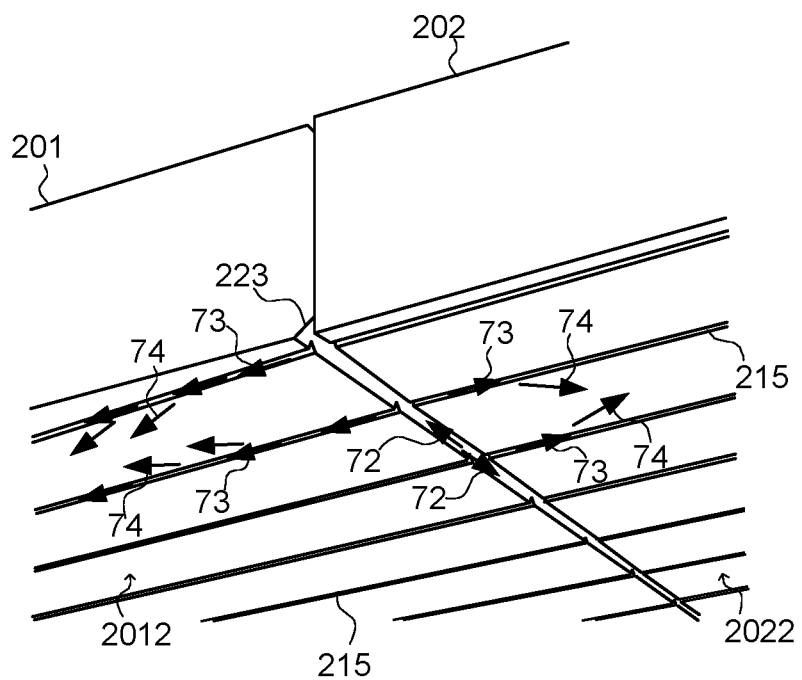

As illustrated schematically in FIG. 11a and FIG. 11b (noting that the reinforcement layers are omitted for the sake of clarity), resin that is fed 61 in the feed area 170 permeates the top reinforcement layer and gathers 62 in the chamfers 223 in the top surface intersections and transported by a pressure gradient via the side surface grooves to the chamfers 223 in the bottom surface intersections. Having gathered in the chamfers 223 in the top and bottom surfaces intersections, the resin flows 63, 73 along the grooves 215 in the top and bottom surfaces 2011, 2012, 2021, 2022, the flow 63, 73 being driven by pressure gradients obtained by the evacuation of air from the enclosure 160 in which the components are arranged. The resin flow 63, 73 driven by the pressure gradients is not only along the grooves 215, but also in directions 64, 74 transverse to the grooves 215 such that the top and bottom surfaces 2011, 2012, 2021, 2022 with reinforcement layers 211, 212 become completely saturated with resin and thereby, when the resin has hardened, merging the single materials into a composite sandwich component.

Finally, in order to illustrate the advantage of weight reduction obtained by the methods of manufacturing and the composite sandwich components of the present disclosure, reference is made to table 1. Table 1 illustrates results from theoretical calculations of comparisons of resin uptake at different thicknesses of composite sandwich components according to the present disclosure with a typical prior art component. Resin uptake is a value that represents the resin captured in surfaces with cell structure and cavities from grooves and perforations.

TABLE 1

| Core thickness (mm) | 10 | 20 | 40 | 80 |
| --- | --- | --- | --- | --- |
| Weight (kg/m$^2$) of profile + core with grooves one direction, top + bottom, as described herein | 2.3 | 2.9 | 4.1 | 6.5 |
| Wight (kg/m$^2$) of prior art component with grooves on one side + perforations | 2.4 | 3.1 | 4.6 | 7.7 |
| Resin savings (kg/m$^2$) | 0.1 | 0.2 | 0.6 | 1.2 |

Specifically, the composite sandwich components according to the present disclosure that are used in the calculations are foam cores with density of 60 kg/m$^3$ having a surface absorption of 500 g/m$^2$, a chamfer profile of 2 mm width by 2 mm depth, a groove profile of 2 mm width by 2 mm depth and a 20 mm groove spacing.

The comparison prior art components are similar foam cores with density of 60 kg/m$^3$ having a groove profile of 2 mm width by 2 mm depth, a 20 mm groove spacing and perforations having a 2 mm diameter arranged in a cross pattern with a 20 mm by 20 mm distance.

Table 1 shows the results in terms of calculated weights (kg/m$^2$) of composite sandwich components manufactured as described herein and calculated weights (kg/m$^2$) of typical prior art composite sandwich components of different thicknesses (mm). The weight differences (kg/m$^2$) at the bottom of the table illustrate that a significant weight saving is obtained when manufacturing composite sandwich components as described herein.

The invention claimed is:

1. A method of manufacturing a composite sandwich component, the composite sandwich component comprising a first core structure, a second core structure, a third core structure, a top reinforcement layer, and a bottom reinforcement layer, each of the first, second and third core structures being made of a material selected from the group consisting of polymer foam and wood, each of the first, second and third core structures having a respective top surface, a bottom surface, a left edge surface, and a right edge surface, the method comprising the steps of:
   (a) forming grooves in the first, second, and third core structures by:
      (i) forming a first plurality of grooves in the top surface of the first core structure, extending from the right edge surface of the first core structure;
      (ii) forming a second plurality of grooves in the bottom surface of the first core structure, extending from the right edge surface of the first core structure;
      (iii) forming a third plurality of grooves in the top surface of the second core structure, extending from the left edge surface of the second core structure;
      (iv) forming a fourth plurality of grooves in the bottom surface of the second core structure, extending from the left edge surface of the second core structure;
      (v) forming a fifth plurality of grooves in the left edge surface of the third core structure, extending from the top surface of the third core structure to the bottom surface of the third core structure;
      (vi) forming a sixth plurality of grooves in the right edge surface of the third core structure, extending from the top surface of the third core structure to the bottom surface of the third core structure;
   (b) chamfering an intersection of the top surface of at least one of the first, second, and third core structures and an edge surface of the at least one of the first, second, and third core structure, and an intersection of the bottom surface of the at least one of the first, second, and third core structures and an edge surface of the at least one of the first, second, and third core structures;
   (c) arranging the first, second and third core structures in relation to each other such that the left edge surface of the third core structure abuts the right edge surface of the first core structure, and such that the right edge surface of the third core structure abuts the left edge surface of the second core structure;
   (d) arranging the first, second and third core structures on the bottom reinforcement layer;
   (e) arranging the top reinforcement layer on the top surfaces of the first, second and third core structures;
   (f) enclosing the arranged first, second, and third core structures and top and bottom reinforcement layers in an enclosure;
   (g) feeding liquid resin onto the top reinforcement layer in a resin feed area above which the left edge surface of the third core structure abuts the right edge surface of the first core structure and the right edge surface of the third core structure abuts the left edge surface of the second core structure; and
   (h) while the feeding of liquid resin continues, evacuating the enclosure of air, whereby the liquid resin is transported horizontally along the first and third pluralities of grooves in the top surfaces of the first and second core structures, respectively, and whereby the liquid resin is transported vertically along the fifth plurality of grooves in the left edge surface of the third core structure and the sixth plurality of grooves in the right edge surface of the third core structure, and horizontally along the second plurality of grooves in the bottom surface of the first core structure and the fourth plurality of grooves in the bottom surface of the second core structure.

2. The method of claim 1, wherein the chamfering comprises chamfering of at least one of:
   (i) the intersection of the top surface of the first core structure and the right edge surface of the first core structure, together with the intersection of the bottom surface of the first core structure and the right edge surface of the first core structure;
   (ii) the intersection of the top surface of the second core structure and the left edge surface of the second core structure, together with the intersection of the bottom surface of the second core structure and the left edge surface of the second core structure;
   (iii) the intersection of the top surface of the third core structure and the left edge surface of the third core structure, together with the intersection of the bottom surface of the third core structure and the left edge surface of the third core structure; and
   (iv) the intersection of the top surface of the third core structure and the right edge surface of the third core structure, together with the intersection of the bottom surface of the third core structure and the right edge surface of the third core structure.

3. A method of manufacturing a composite sandwich component, the composite sandwich component comprising a first core structure, a second core structure, a top reinforcement layer, and a bottom reinforcement layer, each of the first and second core structures being made of a material selected from the group consisting of polymer foam and wood, each of the first and the second core structures having a respective top surface, a bottom surface, a left edge surface, and a right edge surface, the method comprising the steps of:
   (a) forming grooves in the first and second core structures by:
      (i) forming a first plurality of grooves in the top surface of the first core structure, extending from the right edge surface of the first core structure;
      (ii) forming a second plurality of grooves in the bottom surface of the first core structure, extending from the right edge surface of the first core structure;
      (iii) forming a third plurality of grooves in the top surface of the second core structure, extending from the left edge surface of the second core structure;
      (iv) forming a fourth plurality of grooves in the bottom surface of the second core structure, extending from the left edge surface of the second core structure;
      (v) forming a fifth plurality of grooves in at least one of the right edge surface of the first core structure and the left edge surface of the second core structure, the fifth plurality of grooves extending from the top surface to the bottom surface of the first and second core structures (201, 202), respectively;
   (b) chamfering at least one intersection of a top surface of at least one of the first and second core structures and one of the left and right edge surfaces of the at least one of the first and second core structures, and at least one intersection of a bottom surface of at least one of the first and second core structures and one of the left and right edge surfaces of the at least one of the first and second core structures;
(c) arranging the first and second core structures in relation to each other such that the right edge surface of the first core structure abuts the left edge surface of the second core structure;
(d) arranging the first and second core structures on the bottom reinforcement layer;
(e) arranging the top reinforcement layer on the top surfaces of the first and second core structures;
(f) enclosing the arranged first and second core structures and top and bottom reinforcement layers in an enclosure;
(g) feeding liquid resin onto the top reinforcement layer in a resin feed area above which the right edge surface of the first core structure abuts the left edge surface of the second core structure; and
(h) while the feeding of liquid resin continues, evacuating the enclosure of air, whereby the liquid resin is transported horizontally along the first plurality of grooves in the top surface of the first core structure and the third plurality of grooves in the top surface of the second core structures, respectively, and whereby the liquid resin is transported vertically along the fifth plurality of grooves in the right and left edge surfaces of the first and second core structures, respectively, and horizontally along the second plurality of grooves in the bottom surface of the first core structure and the fourth plurality of grooves in the second core structure.

4. The method of claim 3, wherein the chamfering comprises chamfering of at least one of:
(i) the intersection of the top surface and the right edge surface of the first core structure, together with the intersection of the bottom surface and the right edge surface of the first core structure; and
(ii) the intersection of the top surface and the left edge surface of the second core structure, together with the intersection of the bottom surface and the left edge surface of the second core structure.

5. A composite sandwich component, comprising:
a first core structure, a second core structure, a third core structure, a top reinforcement layer, and a bottom reinforcement layer, each of the first, second, and third core structures being made of a material selected from the group consisting of polymer foam and wood, each of the first, second and third core structures having a top surface, a bottom surface, a left edge surface, and a right edge surface, wherein:
the top surface of the first core structure is configured with a first plurality of grooves extending from the right edge surface of the first core structure;
the bottom surface of the first core structure is configured with a second plurality of grooves extending from the right edge surface of the first core structure;
the top surface of the second core structure is configured with a third plurality of grooves extending from the left edge surface of the second core structure;
the bottom surface of the second core structure is configured with a fourth plurality of grooves extending from the left edge surface of the second core structure;
the left edge surface of the third core structure is configured with a fifth plurality of grooves extending from the top surface of the third core structure to the bottom surface of the third core structure;
the right edge surface of the third core structure is configured with a sixth plurality of grooves extending from the top surface of the third core structure to the bottom surface of the third core structure;
at least one intersection of a top surface of one of the first, second, and third core structures and one of the left and right edge surfaces of at least one of the first, second, and third core structures, and at least one intersection of a bottom surface of one of the first, second, and third cores structures and one of the left and right edge surfaces of at least one of the first, second, and third core structures are configured with a chamfer;
the first, second, and third core structures are arranged in relation to each other such that the left edge surface of the third core structure abuts the right edge surface of the first core structure, and such that the right edge surface of the third core structure abuts the left edge surface of the second core structure;
the first, second, and third core structures are arranged on the bottom reinforcement layer; and
the top reinforcement layer is arranged on the top surfaces of the first, second, and third core structures.

6. The composite sandwich component of claim 5, wherein the chamfer comprises one or more of:
a first chamfered intersection of the top surface and the right edge surface of the first core structure, together with a second chamfered intersection of the bottom surface and the right edge surface of the first core structure;
a third chamfered intersection of the top surface and the left edge surface of the second core structure, together with a fourth chamfered intersection of the bottom surface and the left edge surface of the second core structure;
a fifth chamfered intersection of the top surface and the left edge surface of the third core structure together with a sixth chamfered intersection of the bottom surface and the left edge surface of the third core structure; and
a seventh chamfered intersection of the top surface and the right edge surface of the third core structure, together with an eighth chamfered intersection of the bottom surface and the right edge surface of the third core structure.

7. The composite sandwich component of claim 5, wherein the chamfer comprises a chamfering profile that is selected from the group consisting of a triangular chamfering profile, a rectangular chamfering profile, a rounded chamfering profile, a combination of a rectangular and a rounded chamfering profile, and a combination of a rectangular and a triangular chamfering profile.

8. The composite sandwich component of claim 5, wherein the chamfer has a depth that is between 1.5 and 3.0 mm, and a width that is between 1.0 and 2.5 mm.

9. The composite sandwich component of claim 5, wherein any of the first, second, third, fourth, and fifth pluralities of grooves are configured with a groove profile that is selected from the group consisting of any of a triangular groove profile, a rectangular groove profile, a rounded groove profile, a combination of a rectangular and a rounded groove profile, and a combination of a rectangular and a triangular groove profile.

10. The composite sandwich component of claim 5, wherein any of the first, second, third, fourth, and fifth pluralities of grooves have a depth that is between 1.0 and 2.5 mm, and a width that is between 1.0 and 2.5 mm.

11. The composite sandwich component of claim 5, wherein at least two grooves among the grooves of the first, second, third, fourth, and fifth pluralities of grooves are configured in parallel with each other and have an average distance from each other that is between 15 and 35 mm.

12. The composite sandwich component of claim 5, where any of: the first core structure, the second core structure, and the third core structure is made of a material selected from the group consisting of one or more of Polyvinyl chloride, Polyethylene terephthalate, Polyethersulfone, Polymethacrylimide, Styrene acrylonitrile, Polyurethane, Balsa wood, and Plywood.

13. The composite sandwich component of claim 5, wherein at least one of the top reinforcement layer and the bottom reinforcement layer is made of a material selected from the group consisting of one or more of glass fiber material, carbon fiber material, natural fiber material, thermoplastic fiber material, aramid fiber material, and ceramic material.

14. A composite sandwich component, comprising:
a first core structure, a second core structure, a top reinforcement layer, and a bottom reinforcement layer, each of the first and second core structures being made of a material selected from the group consisting of polymer foam and wood, each of the first and second core structures having a top surface, a bottom surface, a left edge surface, and a right edge surface, wherein:
the top surface of the first core structure is configured with a first plurality of grooves extending from the right edge surface of the first core structure;
the bottom surface of the first core structure is configured with a second plurality of grooves extending from the right edge surface of the first core structure;
the top surface of the second core structure is configured with a third plurality of grooves extending from the left edge surface of the second core structure;
the bottom surface of the second core structure is configured with a fourth plurality of grooves extending from the left edge surface of the second core structure;
at least one of the right edge surface of the first core structure and the left edge surface of the second core structure is configured with a fifth plurality of grooves extending from the top surface to the bottom surface of the first and second core structures, respectively;
at least one intersection of a top surface and an edge surface of at least one of the first and second core structures, and at least one intersection of a bottom surface and an edge surface of at least one of the first and second core structures are configured with a chamfer;
the first and second core structures are arranged in relation to each other such that the right edge surface of the first core structure abuts the left edge surface of the second core structure;
the first and second core structures are arranged on the bottom reinforcement layer; and
the top reinforcement layer is arranged on the top surfaces of the first and second core structures.

15. The composite sandwich component of claim 14, wherein the chamfer comprises one or more of:
a first chamfered intersection of the top surface and the right edge surface of the first core structure, together with a second chamfered intersection of the bottom surface and the right edge surface of the first core structure;
a third chamfered intersection of the top surface and the left edge surface of the second core structure, together with a fourth chamfered intersection of the bottom surface and the left edge surface of the second core structure;
a fifth chamfered intersection of the top surface and the left edge surface of the third core structure together with a sixth chamfered intersection of the bottom surface and the left edge surface of the third core structure; and
a seventh chamfered intersection of the top surface and the right edge surface of the third core structure, together with an eighth chamfered intersection of the bottom surface and the right edge surface of the third core structure.

16. The composite sandwich component of claim 14, wherein the chamfer comprises a chamfering profile that is selected from the group consisting of a triangular chamfering profile, a rectangular chamfering profile, a rounded chamfering profile, a combination of a rectangular and a rounded chamfering profile, and a combination of a rectangular and a triangular chamfering profile.

17. The composite sandwich component of claim 14, wherein the chamfer has a depth that is between 1.5 and 3.0 mm, and a width that is between 1.0 and 2.5 mm.

18. The composite sandwich component of claim 14, wherein any of the first, second, third, fourth, and fifth pluralities of grooves are configured with a groove profile that is selected from the group consisting of any of a triangular groove profile, a rectangular groove profile, a rounded groove profile, a combination of a rectangular and a rounded groove profile, and a combination of a rectangular and a triangular groove profile.

19. The composite sandwich component of claim 14, wherein any of the first, second, third, fourth, and fifth pluralities of grooves have a depth that is between 1.0 and 2.5 mm, and a width that is between 1.0 and 2.5 mm.

20. The composite sandwich component of claim 14, wherein at least two grooves among the grooves of the first, second, third, fourth, and fifth pluralities of grooves are configured in parallel with each other and have an average distance from each other that is between 15 and 35 mm.

21. The composite sandwich component of claim 14, where any of: the first core structure, the second core structure, and the third core structure is made of a material selected from the group consisting of one or more of Polyvinyl chloride, Polyethylene terephthalate, Polyethersulfone, Polymethacrylimide, Styrene acrylonitrile, Polyurethane, Balsa wood, and Plywood.

22. The composite sandwich component of claim 14, wherein at least one of the top reinforcement layer and the bottom reinforcement layer is made of a material selected from the group consisting of one or more of glass fiber material, carbon fiber material, natural fiber material, thermoplastic fiber material, aramid fiber material, and ceramic material.

* * * * *